Feb. 7, 1950     E. W. MOLLOY ET AL     2,496,886
RADIATION ALARM AND MEASUREMENT DEVICE
Filed Aug. 9, 1946
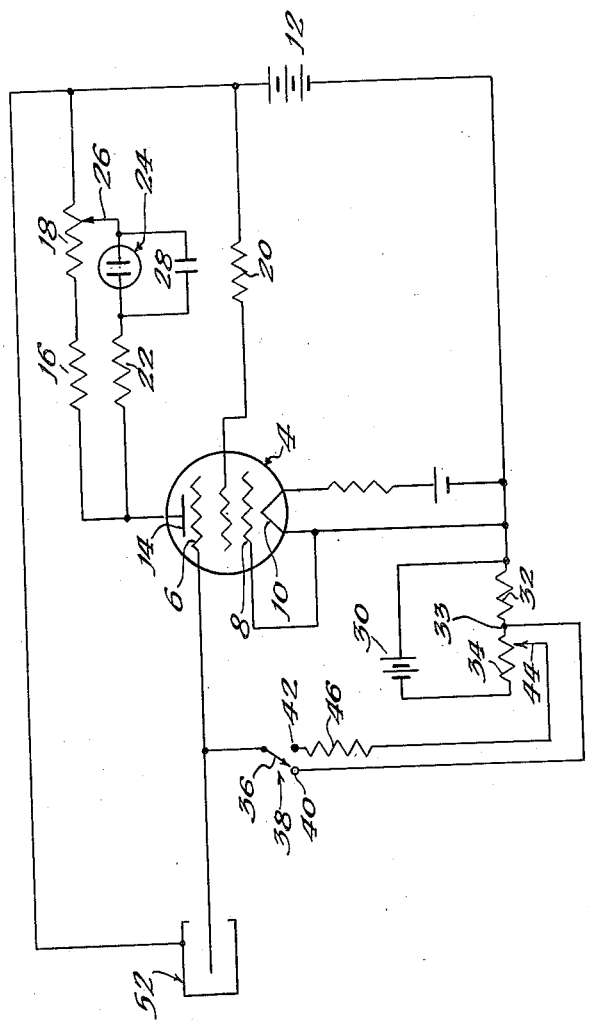
Inventors:
Everett W. Molloy
William H. Hinch
By Robert A. Lavender
Attorney.

Patented Feb. 7, 1950

2,496,886

UNITED STATES PATENT OFFICE 2,496,886

RADIATION ALARM AND MEASUREMENT DEVICE

Everett W. Molloy, Pasadena, Calif., and William H. Hinch, Denver, Colo., assignors to the United States of America as represented by the United States Atomic Energy Commission Application August 9, 1946, Serial No. 689,478

9 Claims. (Cl. 250—83.6)

This invention relates to an improved electronic circuit for a portable radioactivity measuring device. A common form of radioactivity measuring device consists of an ionization chamber which passes a current proportional to the incident radiation and an electronic voltmeter system for measuring the voltage developed across a resistor placed in series with the ionization chamber, the measure of such voltage therefore being a measure of the radioactivity. The direct-current voltmeter systems in common use are subject to the difficulty of relative instability and drift in calibration. One device for avoiding the effects of drift and instability in a direct-current amplifier is the use of a null or slide-back system. The broad method of such a system is to first obtain an indication on, for example, a D'Arsonval meter, in the absence of the input voltage under measurement; application of the voltage under measurement produces a change in the indication; a calibrated source of voltage is then inserted in opposition to the voltage under measurement; when the indicator is by this means returned to its original state, the calibrated voltage is equal to the voltage under measurement, thus constituting a measurement which is independent of drift in the amplification of an amplifying system preceding the indicator, and dependent only on the stability of the calibrated voltage.

It is one object of the present invention to provide a simple slide-back voltmeter system for use with an ionization chamber in a portable radiation meter.

It is a further object of the invention to provide an improved slide-back voltmeter system for measurement of any direct voltage.

Other aims and objects will appear from the description below and the embodiment of the invention illustrated in the drawing, which is a schematic circuit diagram of a radiation detection device.

Referring to the drawing, pentode vacuum tube 4 is, for example, a 959, which is of the acorn type and whose suppressor grid has been found to draw relatively small grid-current when biased negatively with respect to the cathode.

This vacuum tube 4 is connected as an electrometer tube, the third grid 6 being used as control-grid, the first grid 8 being connected to the cathode 10. The plate voltage supply 12, for example a 90-volt battery, is connected to the plate 14 by the plate load consisting of resistor 16, which may be 4 megohms, and potentiometer 18, which may be 1 megohm. The series screen resistor 20 may be, for example, 10 megohms. The series combination of resistor 22, for example 0.5 megohm, and glow-tube 24 is connected in parallel with a portion of the plate load consisting of resistor 16 and potentiometer 18, such portion being determined by the position of the tap 26 on potentiometer 18. A condenser 28, for example 0.1 microfarad, is connected in parallel with the glow-tube 24.

The series combination of resistor 22 and glow-tube 24, with condenser 28 in parallel with the latter, constitutes a relaxation oscillator circuit whose supply voltage is determined by the voltage appearing across resistor 16 and potentiometer 18 and varies with the plate current in the tube 4. When the voltage appearing between plate 14 and tap 26 as a result of plate current in tube 4 is below the potential necessary to initiate a discharge in glow-tube 24, the latter will remain quiescent and will not discharge. But when the voltage so supplied to the relaxation oscillator is above the discharge potential, the glow-tube will flash periodically at a frequency determined by the amount of the excess of the voltage so supplied over the discharge potential. Thus for any given setting of the tap 26, there is a critical value of plate current above which the glow-tube 24 flashes and below which it remains quiescent. The periodic flashing of the glow-tube thus gives a visual indication of the fact that the plate current in tube 4 exceeds the critical value of plate current.

The plate current is controlled by the potential between the control-grid 6 and the cathode 10. A battery 30, for example 4.5 volts, serves for grid bias and as an element of the calibrated voltage source used in measurement as described below. The positive terminal of the battery 30 is connected to the cathode 10. Resistor 32 and potentiometer 34 are connected in series across the battery 30. The movable contact 36 of a switch 38 is connected to the grid 6. One fixed contact 40 of the switch is connected to the junction 33 between resistor 32 and potentiometer 34. When the movable contact 36 is in the position where contact 40 is connected, the grid 6 is negative with respect to cathode 10 by the amount of voltage appearing across resistor 32 of the voltage divider consisting of resistor 32 and potentiometer 34, for example 3.5 volts.

Fixed contact 42 is connected to the tap 44 of potentiometer 34 by resistor 46, for example $10^{10}$ ohms. When movable contact 36 is in the position to connect fixed contact 42, voltage supply 12, ionization chamber 52 and resistor 46 constitute an ionization chamber circuit. As is well-known in the art, the current through the ionization chamber, and thus the voltage across the resistor 46, are proportional to the radioactivity to which the ionization chamber is exposed. The voltage so developed is in series with the voltage of opposite polarity appearing between junction 33 and tap 44 of potentiometer 34. The voltage developed across potentiometer 34 and resistor 32 by the ionization chamber current is negligible because the magnitudes of resistance of these elements are negligible compared to that of resistor 46.

Thus when movable contact 36 is connected to fixed contact 40, the potential between grid 6 and cathode 10 is the voltage appearing across resistor 32. When movable contact 36 is connected to fixed contact 42, the potential between grid 6 and cathode 10 is the sum of the voltage appearing across the resistor 32, the voltage appearing between tap 44 and junction 33, and the voltage appearing across resistor 46 as a result of ionization chamber current. If the voltage appearing between tap 44 and junction 33, and the voltage appearing across resistor 46, these voltages being opposite in polarity, are made equal by adjustment of tap 44, the total voltage between grid 6 and cathode 10 is merely the voltage across resistor 32.

In operating the device illustrated to make a measurement of radioactivity, the movable contact 36 is first placed in position to contact the fixed contact 40. The tap 26 of potentiometer 18 is then adjusted so that the voltage supplied to the relaxation oscillator circuit is just at the critical point where the glow-tube fails to flash. The ionization chamber 52 is exposed to the radioactivity under measurement. The movable contact 36 is then made to connect with fixed contact 42. Tap 44 is then adjusted so that again the voltage supplied to the relaxation oscillator circuit is just at the critical point where the glow-tube fails to discharge. The position of the tap 44 of potentiometer 34 is then a measure of the voltage appearing across resistor 46 as a result of current in the ionization chamber 52. The potentiometer 34 may be calibrated to read directly in radioactivity intensity.

The circuit illustrated in the drawing therefore provides a simple instrument for the measurement of radioactivity. Unlike systems employing indicating meters, the readings are independent of changes in the amplification of the tube 4. In addition, the balance indicator comprising the flashing or non-flashing condition of the glow-tube 24 requires less current drain from the voltage supply 12 than does a system incorporating a meter, unless such a meter is so sensitive as to be relatively great in cost and fragile and unstable in operation.

Application of the teachings of the invention is not limited to the device illustrated in the drawing. The invention may be embodied in a vacuum tube voltmeter adapted to measure voltages other than that produced by ionization current. Any direct voltage source may be impressed between the grid 6 and tap 44, and thus measured. For instance, the voltage produced across a resistor by the current through a phototube may be thus measured. Alternatively, for applications where extremely high input impedance is not required, such as in the measurement in the voltage of batteries or other common voltage measurements, the tube 4 need not be connected as an electrometer tube. Many other equivalent methods for practicing the invention will be apparent to those skilled in the art.

What is claimed is:

1. Apparatus for the detection and measurement of radioactivity comprising, in combination, an ionization chamber circuit adapted to produce a direct voltage proportional to the radioactivity under measurement, an electronic tube having a control-grid connected to the positive ion collector of the ionization chamber, a cathode and a plate, a plate load resistor connecting said plate to a source of plate supply voltage, a resistor and a glow discharge tube connected in series, with each other and in parallel with at least a portion of said plate load resistor, a condenser connected in parallel with said glow-discharge tube, a calibrated variable direct voltage source connected in series opposing with said direct voltage produced by said ionization chamber circuit, and means for impressing the resultant net voltage of said series combination of direct voltage sources between the control-grid and cathode of said electronic tube.

2. Apparatus for the detection and measurement of radio-activity comprising, in combination, an ionization chamber circuit adapted to produce a direct voltage proportional to the radioactivity under measurement, a variable voltage supply an electronic relaxation oscillator circuit connected to the variable voltage supply and having a frequency of oscillation increasing with an increase in potential of said voltage supply, means to decrease the voltage of the voltage supply to the critical value at which the frequency of oscillation decreases to zero in the absence of radioactivity a calibrated variable source of voltage and amplifier means coupling the ionization chamber circuit and the calibrated voltage supply to the voltage supply of the relaxation oscillator circuit, whereby a change in the voltages produced by the ionization chamber circuit and by the calibrated source of voltage causes variation in said voltage supply of said relaxation oscillator, so that when the oscillatory condition of said relaxation oscillator is changed by the appearance of voltage in said ionization chamber circuit the original oscillatory condition may be restored by varying the calibrated source of voltage.

3. Slide-back voltmeter apparatus for measuring a direct voltage comprising, in combination, an electronic tube having a control-grid, a cathode and a plate, a plate load resistor connecting said plate to a source of plate supply voltage, a resistor and a glow-discharge tube connected in series, means for connecting said series combination of resistor and glow-discharge tube in parallel with at least a portion of said plate load resistor, a condenser, means for connecting said condenser in parallel with said glow-discharge tube, a calibrated variable direct voltage source having its negative terminal connected to the control-grid and its positive terminal connected to the cathode, means for connecting said calibrated direct voltage source in series opposition to said positive direct voltage to be measured, and means for impressing the resultant net voltage of said series combination of direct voltage sources between the control-grid and cathode of said electronic tube.

4. Slide-back voltmeter apparatus for measuring a direct voltage comprising, in combination, an electronic relaxation oscillator circuit including a gaseous discharge tube and having a voltage supply adapted to be varied over a range such that the circuit oscillates in one range of values of said voltage supply and fails to oscillate in an adjoining range of lower values of said voltage supply, means for adjusting said voltage supply to the critical value commonly bounding said two ranges in the absence of said voltage under measurement, means for increasing the voltage of the voltage supply of the relaxation oscillator in response to the voltage to be measured, and a calibrated variable source of voltage connected in series opposition with the voltage to be measured, whereby the voltage supply may be restored to the critical value where the oscillator ceases to oscillate.

5. Apparatus for the detection and measurement of a dangerous condition comprising, in combination, means for producing a direct voltage proportional to the intensity of the condition under measurement a variable voltage supply, an electronic relaxation oscillator circuit connected to the variable voltage supply and having a frequency of oscillation increasing with an increase in potential of said voltage supply, means to decrease the voltage of the voltage supply to the critical value where the frequency of oscillation decreases to zero in the absence of a direct voltage resulting from a dangerous condition, a calibrated variable source of voltage, and amplifier means coupling the first said means and the calibrated voltage supply to the voltage supply of the relaxation oscillator circuit, whereby a change in the voltage produced by the first said means and by the calibrated source of voltage causes variation in the voltage supply of the relaxation oscillator, so that when the oscillatory condition of the relaxation oscillator is changed by the appearance of voltage in the first said means, the original oscillatory condition may be restored by varying the calibrated source of voltage.

6. Apparatus for the detection and measurement of a dangerous condition comprising, in combination, means responsive to the existence of a dangerous condition to produce a direct voltage proportional to the intensity of said condition, an electronic tube having a control-grid connected to receive a positive voltage from the means to produce a voltage, a cathode and a plate, a plate load resistor connecting said plate to a source of plate supply voltage, a resistor and a glow-discharge tube connected in series with each other and in parallel with said glow-discharge tube, a calibrated variable direct voltage source connected in series opposing with said direct voltage produced by said first-mentioned means, and means for impressing the resultant net voltage of said series combination of direct voltage sources between the control-grid and cathode of said electronic tube.

7. The method of detecting the existence of a dangerous condition comprising inducing a voltage proportional to the intensity of the dangerous condition, applying to a relaxation oscillator including a glow-discharge tube a voltage equal to the critical voltage required to induce oscillations, and increasing said applied voltage in response to an increase in the induced voltage.

8. The method of detecting and measuring the existence and intensity of a dangerous condition comprising inducing a voltage proportional to the intensity of the dangerous condition, applying to a relaxation oscillator including a glow-discharge tube a voltage equal to the critical voltage required to induce oscillations, increasing said applied voltage in response to an increase in the induced voltage, restoring the critical voltage to the relaxation oscillator by impressing an equal opposing voltage upon the induced voltage, and measuring the magnitude of the impressed voltage.

9. The method of measuring voltage comprising applying to a relaxation oscillator including a glow-discharge tube a voltage equal to the critical voltage required to induce oscillations, increasing said applied voltage in response to the voltage to be measured, restoring the critical voltage to the relaxation oscillator by impressing an equal opposing voltage upon the voltage to be measured, and measuring the magnitude of the impressed voltage.

EVERETT W. MOLLOY.
WILLIAM H. HINCH.

REFERENCES CITED

The following references are of record in the file of this patent:

UNITED STATES PATENTS

| Number | Name | Date |
|---|---|---|
| 1,933,976 | Hanson | Nov. 7, 1933 |
| 1,969,518 | Moles | Aug. 7, 1934 |
| 1,972,141 | Gilbert | Sept. 4, 1934 |
| 2,054,883 | Schlesinger | Sept. 22, 1936 |
| 2,094,318 | Failla | Sept. 28, 1937 |
| 2,099,349 | Rosebury | Nov. 16, 1937 |
| 2,371,628 | Krasnow | Mar. 20, 1945 |
| 2,434,297 | Test et al. | Jan. 13, 1948 |

OTHER REFERENCES

Publication, "Vacuum Tube Voltmeters," by Rider, copyright 1941, chap. IV, pgs. 61–69. (Copy in P. O. Library.)